US006197393B1

(12) United States Patent
Jing et al.

(10) Patent No.: US 6,197,393 B1
(45) Date of Patent: *Mar. 6, 2001

(54) MULTI-LAYER COMPOSITIONS COMPRISING A FLUOROPOLYMER

(75) Inventors: Naiyong Jing; Thomas J. Blong, both of Woodbury; Edward E. Parsonage, St. Paul, all of MN (US); Keizo Yamanaka, Sagamihara (JP); Sehyun Nam, Woodbury; Constance J. Nelson, Stillwater, both of MN (US)

(73) Assignee: 3M Innovative Properties Company, St, Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/096,078

(22) Filed: Jun. 11, 1998

Related U.S. Application Data

(60) Provisional application No. 60/051,089, filed on Jun. 27, 1997, now abandoned.

(51) Int. Cl.$^7$ .......................... B32B 27/00; B32B 27/06; B32B 27/28; G02B 5/128
(52) U.S. Cl. ...................... 428/35.9; 156/243; 359/529; 359/538; 359/540; 359/541; 428/36.91; 428/412; 428/421; 428/422; 428/522; 525/92; 525/175; 525/185; 525/187
(58) Field of Search .................... 428/36.9, 421, 428/422, 36.6, 36.91, 35.9; 156/243; 339/529, 538, 540, 541; 525/92, 175, 185, 187

(56) References Cited

U.S. PATENT DOCUMENTS

| | | | |
|---|---|---|---|
| 3,190,178 | 6/1965 | McKenzie | 88/82 |
| 3,364,049 | 1/1968 | Deak et al. | 117/1 |
| 3,551,025 | 12/1970 | Bingham et al. | 350/105 |
| 3,709,776 | 1/1973 | Fuchs et al. | 161/189 |
| 3,880,690 | 4/1975 | Fuchs et al. | 156/242 |
| 4,025,159 * | 5/1977 | McGrath | 350/105 |
| 4,233,421 | 11/1980 | Worm | 525/343 |
| 4,335,238 | 6/1982 | Moore et al. | 526/254 |
| 4,343,861 | 8/1982 | Stivers | 428/413 |
| 4,348,312 | 9/1982 | Tung | 428/144 |
| 4,421,878 | 12/1983 | Close | 523/454 |
| 4,558,142 | 12/1985 | Holland et al. | 549/465 |
| 4,606,952 | 8/1986 | Sugimoto et al. | 428/36 |
| 4,896,943 | 1/1990 | Tolliver et al. | 350/105 |
| 4,912,171 | 3/1990 | Grootaert et al. | 525/540 |
| 4,933,060 | 6/1990 | Prohaska et al. | 204/192.36 |
| 4,933,090 | 6/1990 | Gill et al. | 210/700 |
| 5,047,287 | 9/1991 | Horiuchi et al. . | |
| 5,066,098 | 11/1991 | Kult et al. | 359/540 |
| 5,069,964 | 12/1991 | Tolliver et al. | 428/325 |
| 5,086,123 * | 2/1992 | Guenthner et al. | 525/276 |
| 5,170,011 | 12/1992 | Martucci | 174/47 |
| 5,262,490 | 11/1993 | Kolb et al. | 525/343 |
| 5,284,184 | 2/1994 | Noone et al. | 138/121 |
| 5,316,608 | 5/1994 | Ocampo et al. | 156/230 |
| 5,383,087 | 1/1995 | Noone et al. | 361/215 |
| 5,427,831 * | 6/1995 | Stevens | 428/36.2 |
| 5,512,225 | 4/1996 | Fukushi | 264/127 |
| 5,552,199 | 9/1996 | Blong et al. | 428/36.9 |
| 5,656,121 * | 8/1997 | Fukushi et al. | 156/326 |
| 5,658,670 * | 8/1997 | Fukushi et al. | 428/421 |
| 5,733,981 | 3/1998 | Coggio et al. | 525/326.2 |
| 5,827,587 * | 10/1998 | Fukushi | 428/36.6 |
| 5,855,977 * | 1/1999 | Fukushi et al. | 428/36.6 |
| 6,074,719 * | 6/2000 | Fukushi et al. | 428/36.9 |
| 6,096,428 * | 8/2000 | Jing et al. | 428/421 |
| 6,117,508 * | 9/2000 | Parsonage et al. | 428/36.91 |

FOREIGN PATENT DOCUMENTS

| | | | |
|---|---|---|---|
| 0 185 590 | 6/1986 | (EP) | C08J/5/12 |
| 0 523 644 | 1/1993 | (EP) | B32B/27/08 |
| 0 551 094 | 7/1993 | (EP) | B32B/7/04 |
| 0767190A1 * | 4/1997 | (EP) | C08G/69/26 |
| 0 767 190 | 4/1997 | (EP) | C08G/69/26 |
| 0 559 445 | 6/1997 | (EP) | F16L/9/12 |
| 2204932 | 11/1988 | (GB) | F16L/11/06 |
| WO 93/14933 | 8/1993 | (WO) | B32B/27/32 |
| WO 95/11464 | 4/1995 | (WO) | G02B/5/124 |
| WO 95/11466 | 4/1995 | (WO) | G02B/5/124 |
| WO 96/05965 | 2/1996 | (WO) | B32B/27/28 |
| WO 96/10491 | 4/1996 | (WO) | B44C/1/165 |
| WO 98/08879 | 3/1998 | (WO) | C08F/8/26 |

OTHER PUBLICATIONS

F.W. Billmeyer, Jr., *Textbook of Polymer Science*, 3$^{rd}$ ed., pp. 398–405, John Wiley & Sons, New York (1984).

Brullo, R.A., "Fluoroelastomer Rubber for Automotive," *Automotive Elastomer & Design*, Jun. 1985 (from Jun. 1985 issue of "Automotive Elastomers & Design").

Brullo, R.A., "Fluoroelastomers Seal Up Automotive Future," *Materials Engineering*, pp. 36–40, Oct. 1988.

"Fluorinated Elastomers," Kirk–Othmer, *Encyclopedia of Chemical Technology*, 3$^{rd}$ ed., vol. 8, pp. 500–515, John Wiley & Sons, New York (1979).

"Organic Fluorine Compounds," Kirk–Othmer, *Encyclopedia of Chemical Technology*, vol. 11, pp. 20, 21, 32, 33, 40, 41, 48, 50, 52, 62, 70, and 71, John Wiley & Sons, New York (1980).

* cited by examiner

*Primary Examiner*—Ellis Robinson
*Assistant Examiner*—Sandra M. Nolan
(74) *Attorney, Agent, or Firm*—John A. Burtis; Scott A. Bardell

(57) ABSTRACT

This invention provides a method of bonding substantially non-fluorinated polymeric material to a fluoropolymer utilizing a bonding composition comprising primary or secondary di- or poly-amine and a melt-processable, substantantially non-fluorinated component. Multi-layer articles and composite constructions, including retroreflective sheeting and fuel line hoses, made of a fluoropolymer layer and a substantially non-fluorinated layer are also provided.

37 Claims, No Drawings

MULTI-LAYER COMPOSITIONS COMPRISING A FLUOROPOLYMER

CROSS-REFERENCE TO RELATED APPLICATION

This application claims priority to U.S. Provisional Application No. 60/051,089, filed Jun. 27, 1997, and now abandoned.

FIELD OF THE INVENTION

The invention relates to multi-layer constructions comprising a fluoropolymer and a substantially non-fluorinated polymeric material as well as to methods of producing same. In another aspect, this invention relates to methods of improving the adhesion between a fluoropolymer and other dissimilar materials, including polyurethanes and polyolefins.

BACKGROUND OF THE INVENTION

Fluorine-containing polymers (i.e., fluoropolymers or fluorinated polymers), are an important class of polymers that include, for example, fluoroelastomers and fluoroplastics. Among this broad polymer class are polymers of high thermal stability, polymers of extreme toughness, and polymers exhibiting usefulness along a broad spectrum of temperatures. Many of these polymers also are almost totally insoluble in a wide variety of organic solvents; see, for example, F. W. Billmeyer, *Textbook of Polymer Science*, 3rd ed., pp. 398–403, John Wiley & Sons, New York (1984).

Fluoroelastomers, particularly the copolymers of vinylidene fluoride with other ethylenically unsaturated halogenated monomers such as hexafluoropropylene find particular utility in high temperature applications, such as in seal gaskets and linings. See, for example, Brullo, R. A., "Fluoroelastomer Rubber for Automotive Applications," *Automotive Elastomer & Design*, June 1985, "Fluoroelastomers Seal Up Automotive Future," *Materials Engineering*, October 1988, and "Fluorinated Elastomers," Kirk-Othmer, *Encyclopedia of Chemical Technology*, 3rd ed., Vol. 8, pp. 500–515, John Wiley & Sons, New York (1979).

Fluoroplastics, particularly polychlorotrifluoroethylene, polytetrafluoroethylene, copolymers of tetrafluoroethylene and hexafluoropropylene, and poly(vinylidene fluoride), have numerous electrical, mechanical, and chemical applications. Fluoroplastics are useful, for example, as wire coatings, electrical components, seals, and in solid and lined pipes and piezoelectric detectors. See, for example, "Organic Fluorine Compounds," Kirk-Othmer, *Encyclopedia of Chemical Technology*, Vol. 11, pp. 20, 21, 32, 33, 40, 41, 48, 50, 52, 62, 70, and 71, John Wiley & Sons, New York (1980).

Multi-layer constructions containing a fluorinated polymer enjoy wide industrial application; multi-layer fluoropolymer constructions find utility in, for example, fuel line hoses and related containers and in retroflective sheeting materials. Increased concerns with evaporative fuel standards give rise to a need for fuel system components that have increased barrier properties to minimize the permeation of fuel vapors through automotive components including fuel filler lines, fuel supply lines, fuel tanks, and other components of the engine's fuel system control system. Various types of constructions have been proposed to address these concerns. In general, the most successful of these are co-extruded multi-layer constructions.

Multi-layer compositions comprising a fluorinated polymer layer and a polyamide or polyolefin layer are known. U.S. Pat. No. 4,933,090 (Krevor), for example, discloses laminate tubular articles that can comprise layers of fluorocarbon elastomers, and PCT Publication WO 93/1493 (LaCourt) discloses a laminar film structure comprising a polyimide and a fluoropolymer. The use of fluorinated polymers in retroreflective sheeting also is known. U.S. Pat. Nos. 3,551,025 and 4,348,312, for example, describe products that include glass microspheres, and PCT WO 95/11466 and WO 95/11464 describe products containing retroreflective cube corner arrays.

A variety of methods can be used to increase the adhesion between a fluorinated polymer layer and a polyamide or polyolefin layer. An adhesive layer can, for example, be added between the two polymer layers. U.S. Pat. No. 5,047,287 discloses a diaphragm, suitable for use in automotive applications, that comprises a base fabric having bonded to at least one surface a fluoro rubber layer by an adhesive that includes an acrylonitrile-butadiene or acrylonitrile-isoprene rubber having an amino group.

Surface treatment of one or both of the layers sometimes is employed to aid bonding. Some, for example, have taught treating fluoropolymer layers with charged gaseous atmosphere and applying subsequently a layer of a second material, for example a thermoplastic polyamide. E.g., European Patent Applications 0185590 (Ueno et al.) and 0551094 (Krause et al.) and U.S. Pat. Nos. 4,933,060 (Prohaska et al.) and 5,170,011 (Martucci).

Blends of the fluoropolymer and the dissimilar layer themselves are in some cases employed as an intermediate layer to help bond the two layers together. European Patent Application 0523644 (Kawashima et al.) discloses a plastic laminate having a polyamide resin surface layer and a fluororesin surface layer. The reference recognizes the difficulties encountered when making laminates having a polyamide layer and a fluororesin layer because of the incompatibility of the two materials. The laminate of the reference is prepared by use of an intermediate layer composed of a blend of an aliphatic polyamide resin with a fluorine-containing graft copolymer.

The addition of a di- or polyamine as an auxiliary bonding agent to a "tie" layer that comprises the dissimilar, non-fluorinated polymer also has been suggested to increase the degree of chemical bonding between the fluoropolymer and the non-fluorinated layer. To achieve its purpose, however, only those fluoropolymers and non-fluorinated polymers having some measure of reactivity with the di- or polyamine will result in an acceptable level of adhesion; polyolefins, for example, must be functionalized (typically with an anhydride, acid or alcohol group) to adhere to the fluoropolymer. Moreover, non-fluorinated polymers that are reactive with a di- or polyamine can suffer a significant change in physical properties by the amine reaction when employed to construct such a tie layer; polyurethanes, for example, can suffer a significant degradation in melt viscosity in the presence of even a minimal amount of a di- or polyamine, leading to a viscosity differential between the tie-layer it comprises and the other layers that can make it prohibitively difficult to co-process the multiple layers; and functionalized polyolefins can suffer a substantial loss of desirable physical properties in the presence of a di- or polyamine. A third significant drawback to the use of such tie layers lies in the use of the di- or polyamine itself. Because of its toxicity and allergenicity, the di- or polyamine is a difficult material to handle directly in any process, and any method that decreases the necessity of direct contact with a di- or polyamine would present a substantial benefit to the art.

SUMMARY OF THE INVENTION

Briefly, in one aspect, this invention provides a method of bonding fluoropolymer to substantially non-fluorinated polymeric material, the method comprising the steps of:

(a) providing a bonding composition comprising primary or secondary di- or polyamine and a melt processable first substantially non-fluorinated base polymer wherein said first substantially non-fluorinated polymer is combinatively reactive with said di- or polyamine;

(b) reacting the bonding composition to form an amine-functionalized base polymer;

(c) compounding the amine-functionalized base polymer with a second substantially non-fluorinated polymer different than the first substantially non-fluorinated base polymer comprising said bonding composition to form a substantially non-fluorinated blend polymeric material;

(d) providing a fluoropolymer; and (e) forming a multi-layer article comprising a substantially non-fluorinated layer made of the substantially non-fluorinated polymeric blend material in contact with a fluorinated layer made of the fluoropolymer, wherein the amine-functionalized base polymer is present at the interface between the substantially non-fluorinated layer and the fluoropolymer in an amount sufficient to bond the two layers.

In other aspects, the present invention provides multi-layer constructions, including retroreflective sheeting and fuel line hoses and related components, comprising multi-layer articles made according to the above-described methods.

In practice of the invention, the presence of a melt-processable, amine-functionalized polymer in the substantially non-fluorinated polymeric blend material provides a mechanism for bonding a wide array of substantially non-fluorinated polymeric materials (including those that are unreactive to a di- or polyamine) to layers composed of fluoropolymers. The substantially non-fluorinated polymeric layers containing the amine-functionalized base polymer also are processable with a fluoropolymer layer and exhibit resulting physical properties that meet or exceed the properties inherent to the polymers that comprise the composite structure.

DETAILED DESCRIPTION OF PREFERRED EMBODIMENTS

Fluoropolymer materials useful in the present invention include those fluoropolymers broadly categorized structurally into two basic classes. A first class includes those fluorinated polymers, copolymers, terpolymers, etc, comprising interpolymerized units derived from vinylidene fluoride (sometimes referred to as "$VF_2$" or "VDF"). Preferably fluoropolymer materials of this first class comprise at least 3% by weight of interpolymerized units derived from $VF_2$. Such polymers may be homopolymers of $VF_2$ or copolymers of $VF_2$ and other ethylenically unsaturated monomers.

$VF_2$-containing polymers and copolymers can be made by well-known conventional means, for example by free-radical polymerization of $VF_2$ with or without other ethylenically-unsaturated monomers. The preparation of colloidal aqueous dispersions of such polymers and copolymers is described, for example, in U.S. Pat. No. 4,335,238. It follows the customary process for copolymerizing fluorinated olefins in colloidal aqueous dispersions, which is carried out in the presence of water-soluble initiators that produce free radicals, such as, for example, ammonium or alkali metal persulfates or alkali metal permanganates, and in the presence of emulsifiers, such as, in particular, the ammonium or alkali metal salts of perfluorooctanoic acid.

Useful fluorine-containing monomers include hexafluoropropylene ("HFP"), tetrafluoroethylene ("TFE"), chlorotrifluoroethylene ("CTFE"), 2-chloropentafluoro-propene, perfluoroalkyl vinyl ethers, e.g. $CF_3OCF=CF_2$ or $CF_3CF_2OCF=CF_2$, 1-hydropentafluoropropene, 2-hydropentafluoropropene, dichlorodifluoroethylene, trifluoroethylene, 1,1-dichlorofluoroethylene, vinyl fluoride, and perfluoro-1,3-dioxoles such as those described in U.S. Pat. No. 4,558,142 (Squire). Certain fluorine-containing di-olefins also are useful, such as perfluorodiallylether and perfluoro-1,3-butadiene. Said fluorine-containing, monomer or monomers also may be copolymerized with fluorine-free terminally unsaturated olefinic comonomers, e.g., ethylene or propylene. Preferably at least 50% by weight of all monomers in a polymerizable mixture are fluorine-containing. Said fluorine-containing monomer may also be copolymerized with iodine- or bromine-containing cure-site monomers in order to prepare peroxide curable polymer. Suitable cure-site monomers include terminally unsaturated monoolefins of 2 to 4 carbon atoms such as bromodifluoroethylene, bromotrifluoroethylene, iodotrifluoroethylene, and 4-bromo-3,3,4,4-tetrafluoro-butene-1.

Commercially available fluoropolymer materials of this first class include, for example, THV 200 fluoropolymer (available from Dyneon LLC of Saint Paul, Minn.), THV 500 fluoropolymer (also available from Dyneon LLC), Kynar™ 740 fluoropolymer (available from Elf Atochem North America, Inc.), and Fluorel™ FC-2178 fluoropolymer (available from Dyneon LLC).

A second class of fluorinated material useful in the practice of the invention broadly comprises those fluorinated polymers, copolymers, terpolymers, etc, comprising interpolymerized units derived from one or more of hexafluoropropylene ("HFP") monomers, tetrafluoroethylene ("TFE") monomers, chlorotrifluoroethylene monomers, and/or other perhalogenated monomers and further derived from one or more hydrogen-containing and/or non-fluorinated olefinically unsaturated monomers. Useful olefinically unsaturated monomers include alkylene monomers such as ethylene, propylene, 1-hydropentafluoropropene, 2-hydropentafluoropropene, etc.

Fluoropolymers of this second class can be prepared by methods known in the fluoropolymer art. Such methods include, for example, free-radical polymerization of hexafluoropropylene and/or tetrafluoroethylene monomers with non-fluorinated ethylenically-unsaturated monomers. In general, the desired olefinic monomers can be copolymerized in an aqueous colloidal dispersion in the presence of water-soluble initiators which produce free radicals such as ammonium or alkali metal persulfates or alkali metal permanganates, and in the presence of emulsifiers such as the ammonium or alkali metal salts of perfluorooctanoic acid. See for example U.S. Pat. No. 4,335,238.

Representative of the fluoropolymer materials of the second class are poly(ethylene-co-tetrafluoroethylene) (ETFE), poly(tetrafluoroethylene-co-propylene), poly (chlorotrifluoroethylene-co-ethylene) (ECTFE), and the terpolymer poly(ethylene-co-tetrafluoroethylene-co-hexafluoropropylene), among others; all of which may be prepared by the above-described known polymerization methods. Many useful fluoropolymer materials also are available commercially, for example from Dyneon LLC under the trade designations Hostaflon™ X6810, and X6820; from Daikin America, Inc., under the trade designations Neoflon™ EP-541, EP-521, and EP-610; from Asahi Glass Co. under the trade designations Aflon™ COP C55A, C55AX, C88A; and from DuPont under the trade designations Tefzel™ 230 and 290.

The bonding composition of the invention comprises, in its most essential aspect, a melt-processable polymeric component comprising a first substantially non-fluorinated base polymer and a di- or polyamine having primary or secondary amine functionality. The base polymer typically is functionalized by reaction with the di- or polyamine. The base polymer is, therefore, chosen as a melt-processable, substantially non-fluorinated polymer that is combinatively chemically reactive with a di- or polyamine, the most useful classes of which include polyamides, polyamide imides, polyether imides, polyimides, polyureas, polyurethanes, polyesters, polycarbonates, functionalized polyolefins (e.g., with anhydride, acid, or alcohol groups), and polyketones.

The melt-processable, amine-functionalized base polymer is compounded with a selected second substantially non-fluorinated polymer to form a substantially non-fluorinated polymeric blend material. This blend material is processed with the fluoropolymer to form a multi-layer article or composite structure that exhibits a high degree of interlayer bond strength. Typically, the amine-functional base polymer is formed by admixing the base polymer component with a di- or polyamine in a manner to affect a chemical reaction between the two components prior to their addition into the substantially non-fluorinated polymeric material. The conditions (e.g., time and temperature) under which the components will react will of course be determined in part by the particular selection of the constituent materials, and the selection of those appropriate conditions will be well within the competence of the skilled artisan. For a typical selection of an aliphatic amine and a polyamide as the bonding composition components, melt-mixing the di- or polyamine with the base polymer at a temperature of about 230° C. for between three and four minutes would, for example, prove sufficient.

Any suitable di- or polyamine may be employed to react with the base polymer to impart amine functionality to that polymer. The term "di-, or polyamine," as used within this description refers to organic compounds containing at least two non-tertiary amine groups. Any primary or secondary amine may be employed, although primary amines are preferred to secondary amines. Aliphatic, aromatic, cycloaliphatic, and oligomeric di- and polyamines all are considered useful in the practice of the invention. Representative of the classes of useful di- or polyamines are 4,4'-methylene dianiline, 3,9-bis-(3-aminopropyl)-2,4,8,10-tetroxapino[5,5]undecane, and polyoxyethylenediamine. Many di- and polyamines, such as those just named, are available commercially, for example, under the trade designation "JEFFAMINES" (available from Texaco Chemical Company of Houston, Tex.). The most preferred di- or polyamines include aliphatic diamines or aliphatic di- or polyamines that comprise at least two primary amines, such as hexamethylene diamine, dodecanediamine, and 2,4,8,10-tetraoxaspiro[5,5]undecane-(3,9-dipropanamine).

The di- or polyamine can be of any molecular weight that when used in accordance with the present description will impart amine functionality to the base polymer and will impart adhesive bond strength between a fluoropolymer and a substantially non-fluorinated polymeric material. As an example, the di- or polyamine may have a weight average molecular weight of below 5,000, more preferably below 2,000, or 1,000, as measured by mass spectroscopy or gel permeation chromatography (GPC). The molecular weight of the resulting amine-functionalized base polymer will be higher than the di- or polyamine used to create it leading, in part, to the benefits sought in practice of this invention. Most typically, the base polymers to be amine-functionalized will have a weight average molecular weight of greater than or equal to about 10,000. Preferably, however, such polymers will have weight average molecular weights of greater than 15,000. In some cases, the base polymers will have weight average molecular weights of greater than 30,000.

Polyamides are preferred for forming the bonding composition. Polyamides useful as the base polymer for this purpose generally are available commercially. For example, polyamides such as any of the well-known nylons are available from a number of sources. Particularly preferred polyamides are nylon 6, nylon 6,6, nylon 11, or nylon 12. It should be noted that the selection of a particular polyamide material should be based upon the physical requirements of the particular application for the resulting article. For example, nylon 6 and nylon 6,6 offer higher heat resistant properties than nylon 11 or nylon 12, whereas nylon 11 and nylon 12 offer better chemical resistance. In addition to those polyamide materials, other nylon materials such as nylon 6,12, nylon 6,9, nylon 4, nylon 4,2, nylon 4,6, nylon 7, and nylon 8 also may be used. Ring containing polyamides, e.g. nylon 6,T and nylon 6,I, may also be used. Polyether-containing polyamides, such as Pebax™ polyamides, may also be used. One particularly useful amine-functionalized, substantially non-fluorinated polyamide was itself commercially available under the trade designation Grilamid™ FE4943, and is currently available commercially as Grilamid™ XE3598 and Grilamid™ FE5405, both available from EMS Chemie AG (Switzerland).

Melt-processable polyamide imides, polyether imides, and polyimides may also be used as the base polymer in the bonding composition. The term "melt-processable" is used herein to describe polymers that are molten or melt-processable under the conditions to which they are subjected in practicing the methods of the invention. The most useful polyamides, polyamide imides, polyether imides, and polyimides will be those that are melt-processable at or below about 270° C., more preferably at or below about 260° C.

Useful polyamide imides are available commercially and include, for example, polyamide imides sold under the TORON tradename by the Amoco Chemical Corporation of Chicago, Ill. Useful polyether imides also are commercially available including those sold under the tradename ULTEM by General Electric Plastics of Pittsfield, Mass. Other useful commercially available base polymers include polyesters, polycarbonates, polyketones, and polyureas. These materials are generally available commercially including SELAR polyesters from DuPont (Wilmington, Del.), LEXAN polycarbonates (General Electric, Pittsfield, Mass.), KADEL polyketones (Amoco, Chicago, Ill.), and SPECTRIM polyureas (Dow Chemical, Midland, Mich.).

The substantially non-fluorinated layers of the composite structures of the invention comprise at least a second substantially non-fluorinated polymer that is different from the first substantially non-fluorinated base polymer utilized in the bonding composition (i.e., the two selected substantially non-fluorinated polymers are not the same polymer). Such substantially non-fluorinated polymers can include any of a number of well known, substantially non-fluorinated polymers. As used herein the term "substantially non-fluorinated" refers to polymers and polymeric materials having fewer than 10 percent of their carbon-bonded hydrogen atoms replaced with fluorine atoms. Preferably, the substantially non-fluorinated polymer has fewer than 2 percent of its carbon-bonded hydrogen atoms replaced with fluorine atoms, and more preferably fewer than 1 percent of its carbon-bonded hydrogen atoms are replaced with fluorine atoms. Preferred substantially non-fluorinated polymers include thermoplastic polymers such as polyurethanes, functionalized and unfunctionalized polyolefins, polystyrenes, polyesters, polycarbonates, polyketones, polyureas, polyacrylates and polymethacrylates. The particular substantially non-fluorinated polymer selected will depend upon the application or desired properties, such as chemical and/or flame resistance, of the composite article according to the invention.

The polyolefin polymers useful as the second substantially non-fluorinated polymer generally are homopolymers or copolymers of ethylene, propylene, acrylic monomers, or other ethylenically unsaturated monomers, for example, vinyl acetate and higher alpha-olefins. Such polymers and copolymers can be prepared by conventional free-radical polymerization or catalysis of such ethylenically unsaturated monomers. The degree of crystallinity of the hydrocarbon polymer or copolymer can vary; the polymer may, for example, be a semi-crystalline high density polyethylene or may be an elastomeric copolymer of ethylene and propylene. Carboxyl, anhydride, or imide functionalities may be incorporated into the second substantially non-fluorinated polymer by homo- or copolymerization of functional monomers, for example, acrylic acid or maleic anhydride, or by modifying a polymer after polymerization, for example, by grafting, by oxidation or by forming ionomers. Representative of such substantially non-fluorinated polymer useful in the present invention include, but are not limited to, co- and terpolymers of the above-listed functional monomers with, for example, propylene, ethylene, vinyl acetate, etc. The carboxyl, anhydride, or imide functional polymers useful as the hydrocarbon polymer generally are commercially available. Anhydride modified polyethylenes, for example, are available commercially from DuPont, Wilmington, Del., under the trade designation BYNEL co-extrudable adhesive resins.

Useful polyacrylates and polymethacrylates include, for example, polymers of acrylic acid, methyl acrylate, ethyl acrylate, acrylamide, methylacrylic acid, methyl methacrylate, and ethyl acrylate, to name a few. As mentioned above, other polymer useful as the second substantially non-fluorinated polymer include polyesters, polycarbonates, polyketones, and polyureas. These materials generally are commercially available, for example, under the tradenames SELAR polyester (DuPont, Wilmington, Del.), LEXAN polycarbonate (General Electric, Pittsfield, Mass.), KADEL polyketone (Amoco, Chicago, Ill.), and SPECTRIM polyurea (Dow Chemical, Midland, Mich.).

Members of one useful class of the second substantially non-fluorinated polymers suffer chemical degradation in the presence of a di- or polyamine. Generally such degradation will be evidenced by a reduction in the viscosity of the molten bulk polymer; a reduction that can be significant (e.g., as much as 33%) even in the presence of a minimal amount (e.g., less than about 1 percent by weight relative to the bulk polymer) of a di- or polyamine. Substantially non-fluorinated polymers suffering such degradation in the presence of an amine include principally polyurethanes. It will be understood that the practice of the invention can alleviate the myriad deleterious effects of the viscosity degradation experienced by such polymers. The threshold degree of degradation at which the processing of the multilayer composite structures is compromised, however, necessarily is not quantifiable; even a small decrease in the bulk melt viscosity of the substantially non-fluorinated polymer, for example, may create significant processing difficulties that will be alleviated by the application of the present invention, and such an application is considered within the scope hereof.

Polyurethanes useful as the second substantially non-fluorinated polymer include aliphatic, cycloaliphatic, aromatic, and polycyclic polyurethanes. These polyurethanes typically are produced by reaction of a polyfunctional isocyanate with a polyol, often in the presence of a catalyst, according to well known reaction mechanisms. Useful diisocyanates for employment in the production of a polyurethane include, for example, dicyclohexylmethane-4,4'-diisocyanate, isophorone diisocyanate, 1,6-hexamethylene diisocyanate, cyclohexyl diisocyanate, and diphenylmethane diisocyanate. Combinations of one or more polyfunctional isocyanates may also be used. Useful polyols include polypentyleneadipate glycol, polytetramethylene ether glycol, polyethylene glycol, polycaprolactone diol, poly-1,2-butylene oxide glycol, and combinations thereof. Chain extenders such as butanediol or hexanediol may also optionally be used in the reaction. Many useful polyurethanes also are commercially available and include: PN-04 or PN-09 from Morton International, Inc., Seabrook, New Hampshire, and X-4107 from B.F. Goodrich Company, Cleveland, Ohio.

The polymeric layers comprising the composite structures of the invention may include optional additives, such as those typically used in other thermoplastic applications. Such additional adjuvants include, for example, pigments, tackifiers, fillers, electrically conductive materials (such as those described in U.S. Pat. No. 5,552,199), electrically insulative materials, stabilizers, antioxidants, lubricants, processing aids, impact modifiers, viscosity modifiers, as well as any appropriate mixture or mixtures thereof.

One or more organo-onium compounds also may be incorporated into the substantially non-fluorinated polymeric material as a catalytic agent to improve further the bonding characteristics of the material. As is known in the art, an organo-onium is the conjugate acid of a Lewis base (e.g. phosphine, amine, ether, and sulfide) and can be formed by reacting said Lewis base with a suitable alkylating agent (e.g., an alkyl halide or acyl halide) resulting in an expansion of the valence of the electron donating atom of the Lewis base and a positive charge on the organo-onium compound. Many of the organo-onium compounds useful in the present invention contain at least one heteroatom, i.e., a non-carbon atom such as N, P, S, O, bonded to organic or inorganic moieties. One class of quaternary organo-onium compounds particularly useful in the present invention broadly comprises relatively positive and relatively negative ions wherein a phosphorus, arsenic, antimony or nitrogen generally comprises the central atom of the positive ion, and the negative ion may be an organic or inorganic anion (e.g., halide, sulfate, acetate, phosphate, phosphonate, hydroxide, alkoxide, phenoxide, bisphenoxide, etc.).

Many of the useful organo-onium compounds are described and known in the art. See, for example, U.S. Pat. Nos. 4,233,421 (Worm), 4,912,171 (Grootaert et al.), 5,086,123 (Guenthner et al.), and 5,262,490 (Kolb et al.) all of whose descriptions are herein incorporated by reference. Representative examples include the following individually listed compounds and mixtures thereof:

triphenylbenzyl phosphonium chloride
tributylallyl phosphonium chloride
tributylbenzyl ammonium chloride
tetrabutyl ammonium bromide
triphenyl sulfonium chloride
tritolyl sulfonium chloride
8-benzyl-1,8-diazabicyclo [5,4,0]-7-undecenium chloride
benzyl tris(dimethylamino) phosphonium chloride
benzyl(diethylamino)diphenylphosphonium chloride Amine compounds and salts of amine compounds other than di- or polyamines may also be incorporated into the compositions of the present invention as catalytic agents. Representative classes of such amine compounds include aliphatic, aryl and amidine amine compounds, preferably a secondary or tertiary amine compound. Examples of these include 4-dimethyl amino pyridine, triisooctyl amine, 1,8-diazobicyclo(2,2,2)-octane, 1,5-diazobicyclo[4.3.0]non-5-ene, 1,8-diazobicyclo[5.4.0]undec-7-ene, imidazole, and benzotriazole, to name a few.

A useful class of amine compounds can be represented by the following formula:

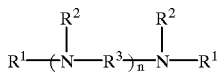

where:

$R^1$ is independently selected from substituted and unsubstituted alkyl, cycloalkyl, aryl, aralkyl, and alkaryl groups;

$R^2$ is independently selected from H, and substituted and unsubstituted alkyl, cycloalkyl, aryl, aralkyl and alkaryl groups;

$R^3$ is selected from substituted or unsubstituted divalent alkylene, cycloalkylene, arylene, aralkylene, and alkarylene groups; n is a number from 0 to about 100.

The bonding composition or the amine-functional base polymer as above described (and optionally any tackifier and/or catalyst) may be combined with the second substantially non-fluorinated polymer by conventional means. The bonding composition, for example, can be melt-processed with the second substantially non-fluorinated polymer to produce a substantially non-fluorinated polymeric blend material. The bonding composition typically will be combined with the second substantially non-fluorinated polymer at a level such that the amine-functional base polymer component comprises anywhere from about 1 to about 50 weight percent or more of the resulting non-fluorinated polymeric blend material. The second substantially non-fluorinated polymer (less any tackifier, organo-onium compound or other additives) typically will make up the remainder of the non-fluorinated polymeric blend material.

It will be understood that the particular chosen composition of the non-fluorinated polymeric blend material will, in part, be determined by the necessity that enough of the amine-functional base polymer be present at the interface with the fluoropolymer layer to obtained a desired level of adhesion. For compositions where the second substantially non-fluorinated polymer to be combined with the bonding composition is degraded by the presence of an amine (e.g., polyurethane), the bonding composition typically comprises about 50% or less by weight of the substantially non-fluorinated polymeric blend material. In such blends, where it is desirable to retain the bulk properties of the second substantially non-fluorinated polymer (e.g., clarity or modulas), the bonding composition can be added at levels of about 30% or less.

Where the substantially non-fluorinated layer comprises a substantially non-fluorinated polymer that is not reactive to a di- or polyamine (e.g., an unmodified polyolefin), or where said polymer is not compatible or miscible with the base polymer used to form the bonding composition (e.g., a polyamide when the base polymer is an unmodified polyolefin), such compositions preferably are formulated and/or processed such that the bonding composition and the second substantially non-fluorinated polymer each form continuous phases. In such instances, the respective amounts of the materials may be approximately equivalent. Using considerations well known in the art, the viscosities and densities of the respective materials should be considered in preparing such formulations. As an alternative to such a formulation, however, where the second substantially non-fluorinated polymer forms the continuous phase of the substantially non-fluorinated layer, the layer preferably is bonded to the fluoropolymer layer in a manner (e.g., for extended time and/or at elevated temperatures) to allow the amine-functional base polymer to diffuse to the interface of the substantially non-fluorinated and fluoropolymer layers. Alternatively, or in addition to the above, the viscosity of the amine-functional base polymer can be selected such that it migrates to the surface of the substantially non-fluorinated blend material during the processing step (e.g., extrusion), used to combine the substantially non-fluorinated and fluoropolymer layers.

In instances such as the above, where the second substantially non-fluorinated polymer is unreactive with amines, or is immiscible with the base polymer used to make the bonding composition, it may be preferred to modify or functionalize (e.g., maleate or carboxylate), the second polymer to increase its compatibility within the non-fluorinated polymeric blend material. Additionally, or alternatively, compatibilizing agents may be used to increase the cohesiveness of the polymeric blend material. Such non-fluorinated polymeric blend materials (e.g., formed from a diamine and a polyamide as the bonding composition and a maleated polyethylene) may comprise from about 25% or less, to about 75% or more of the bonding composition.

Where the second substantially non-fluorinated layer comprises a polymer that is not substantially degraded in the presence a di- or polyamine, the di- or polyamine and amine reactive base polymer that form the bonding composition need not be pre-reacted prior to formation of the non-fluorinated polymeric blend material. In such instances, the amine functionalized base polymer will be formed in situ during processing with the other components of the articles of the invention.

Methods known in the fluoropolymer art can be used to produce a bonded multi-layer article wherein the fluoropolymer material is in substantial contact with the substantially non-fluorinated polymeric blend material. For instance, the fluoropolymer and the substantially non-fluorinated polymeric material can be formed into thin film layers by known methods. The fluorinated layer and the substantially non-fluorinated layer can then be laminated together under heat and/or pressure to form a bonded, multi-layer article. Alternatively, the fluoropolymer and the substantially non-fluorinated polymeric blend material, along with one or more additional layers where desired, can be co-extruded into a multi-layer article. See e.g., U.S. Pat. Nos. 5,383,087, and 5,284,184, whose descriptions are incorporated herein by reference for such purpose.

A reactive extrusion process finds particular utility in forming substantially non-fluorinated polymeric blend materials of the invention. Such a process may be carried out continuously and solventless and presents the opportunity to extrude the resultant polymers into pellets, films, fibers, tubes or the like directly from an extruder. In practicing such an extrusion process, the extruder temperature should be sufficient to permit reaction between the components of the bonding composition prior to their incorporation into the chosen substantially non-fluorinated polymer. The temperature also should be sufficient to permit conveyance of the materials through the extruder and any subsequent processing equipment (e.g., necktubes, feedblocks, or dies). Preferably, the extruder is maintained between about 150 and about 275° C., more preferably between about 175 and 260° C. Residence time in the extruder typically will vary from about 30 seconds to about 15 minutes, more typically from about 3 to about 10 minutes, although the chosen residence time will depend on several parameters including, for example, the length-to-diameter ratio of the extruder, chosen mixing rates, overall flowrates, the reactants used, and the necessity, if any, to blend in additional materials. When a wiped surface extruder is used, relatively close clearances between the screw flight lands and the barrel are preferred, with the value typically lying between about 0.1 and about 2 mm. The screws preferably are fully or partially intermeshing or are fully or partially wiped in the extruder zones where a substantial portion of the reaction takes place.

The heat and pressure of the method by which the layers are brought together (e.g., coextrusion or lamination) may be sufficient to provide adequate adhesion between the layers. It may, however, be desirable to further treat the resulting multi-layer article, for example with additional heat, pressure, or both, to provide additional adhesive bond strength between the layers. One way of supplying additional heat, when the multi-layer article is prepared by extrusion, is by delaying the cooling of the multi-layer article after co-extrusion. Alternatively, additional heat energy may be added to the multi-layer article by laminating or coextruding the layers at a temperature higher than necessary for merely processing the several components. Or, as another alternative, the finished multi-layer article may be held at an elevated temperature for an extended period of time. For example the finished multi-layer article may be placed in an oven or heated liquid bath or a combination of both.

The methods of the present invention provide multi-layer articles exhibiting ease of processability and improved interlayer adhesive bond strength between a fluorinated layer and a substantially non-fluorinated layer. Multi-layer articles of the present invention can have utility as films, containers, or tubing that require specific combinations of barrier properties, high and low temperature resistance, and chemical resistance. The methods and compositions of this invention are particularly useful for making multi-layer articles suitable for use in motor vehicles, for example as fuel-line hoses, and for films and blow-molded articles such as bottles, where chemical resistance and barrier properties are important.

The multi-layer articles of the present invention can have two, three, or even more separate layers. For example, the present invention contemplates a multi-layer article including a fluorinated layer, a substantially non-fluorinated layer, and optionally further comprising one or more additional layers comprising fluorinated or non-fluorinated polymers. As a specific example, a bi-layer article can be prepared according to the present invention, the bi-layer article comprising a fluorinated layer and a substantially non-fluorinated layer containing the amine-functionalized base polymer, wherein the bonding composition is used to increase the adhesive bond strength between the two layers. One or more additional layers comprising fluorinated or non-fluorinated polymer can, either thereafter or simultaneously (i.e., to form a tri-layer article), be bonded to one or more of the fluorinated layer or substantially non-fluorinated layer, to produce a multi-layer article having three or more layers.

Any appropriate non-fluorinated polymeric material may be utilized as an additional layer; useful among them are any of a number of well known, hydrocarbon-based polymers. Thermoplastic polyamides, polyurethanes, polyolefins, polyesters, and acrylate and methacrylate polymers and copolymers find utility in such embodiments. Any of the previously-described fluoropolymers may also be added to the multi-layer articles of the invention.

Utilizing techniques of selection, a multi-layer composite article may be constructed having the combined benefits of each constituent layer. For instance, a fluoropolymer that exhibits particular advantage in bonding to a chosen substantially non-fluorinated polymeric material (such as the commercially available THV 200) may be used as the fluoropolymer layer immediately adjacent to the layer of substantially non-fluorinated polymer, and a fluoropolymer exhibiting relatively superior vapor barrier properties (such as the commercially available THV 500) may be bonded to the immediate fluoropolymer layer. A composite so formed possesses the combined advantages of its constituent layers: superior bond strength and superior vapor barrier properties.

Transparent embodiments of multi-layer compositions of the present invention may find particular utility in the construction of retroreflective sheeting articles generally, and particularly when resistance to chemical agents, solvents, soiling, and/or reduced moisture vapor transmission and/or good interlayer adhesion in flexible sheetings subject to severe bending and flexing is required.

The compositions of this invention may be rendered retroreflective by forming retroreflective elements on one side of the composition, or alternatively, by attaching a retroreflective base sheet by means of a transparent adhesive or by direct lamination. The retroreflective base sheet may comprise a member with cube corner retroreflective elements or may comprise a microsphere-based retroreflective structure, e.g. comprising a monolayer of transparent microspheres and reflective means disposed on the opposite side of the monolayer from the multi-layer composition. It is preferred that the base layer is disposed on the non-fluoropolymer layer of the multi-layer composition. An embodiment of this invention includes the encapsulated retroreflective sheeting article as is disclosed in U.S. Pat. No. 3,190,178, in which the cover layer is provided by a multi-layer composition according to the present invention.

Retroreflective articles of the invention may be made in rigid or flexible form. Multi-layer compositions of the present invention may be used as barrier layers. An embodiment of the present invention includes articles in accordance with U.S. Pat. No. 5,069,964 which is incorporated herein by reference, in which the plasticizer-resistant barrier layer comprises a multi-layer composition in accordance with the present invention. The multi-layer compositions of the present invention may find particular utility in the construction of flexible retroreflective sheeting articles. A preferred embodiment of the present invention includes a retroreflective article in accordance with PCT WO 95/11464 or PCT/WO 95/11943, both of which are incorporated herein by reference, wherein the flexible overlay film described in PCT WO 95/11464 or the flexible body layer of PCT/WO 95/11943 is constituted by a multi-layer composition in accordance with this invention. Suitable fluoropolymers comprising interpolymerized units of vinylidene fluoride of the type specified for use with flexible sheeting in accordance with these two patent applications may be poly (vinylidene fluoride-co-hexafluoropropylene), for example, Kynar Flex™-2800 available from Elf Atochem North America, Inc., Philadelphia, Pa., or poly (tetrafluoroethylene-co-hexafluoropropylene-co-vinylidene fluoride), for example, THV 200 or 500. The non-fluoropolymer layer of the present invention in such constructions may be any of the non-fluoropolymers specified in the above patent applications, for example, ionomeric ethylene copolymers, low density polyethylenes, polyethylene copolymers, or aliphatic or aromatic polyurethanes or similar compounds. For highly flexible products, a multi-layer composition of this invention that includes a THV layer and a polyurethane layer is particularly preferred. The microstructure elements including either solidly connected or segregated cube corners may be microreplicated, preferably onto the non-fluoropolymer layer. Alternatively, the multi-layer compositions may be adhered to microstructure elements. As will be understood, any conventional form of retroreflective microstructure elements may be used including, for example, arrays of canted, tiled, specially shaped, colored, or colorless cube corner elements.

Similarly, multi-layer compositions according to the present invention may be used with retroreflective sheeting products including microspheres in a base layer. Specific embodiments of the invention include retroreflective articles according to U.S. Pat. Nos. 4,896,943, U.S. Pat. No. 4,025,159 or U.S. Pat. No. 5,066,098, all of which are included herein by reference, in which the cover film of U.S. Pat. Nos. 4,896,943 or 4,025,159 or the cover sheet of U.S. Pat. No. 5,066,098 is constituted by a multi-layer composition in accordance with this invention. The multi-layer compositions of the present invention further may themselves include retroreflective micro-elements, such as transparent microspheres, incorporated into the fluoropolymer or the non-fluoropolymer layer, for example in a further embodiment of the present invention, the fluoropolymer layer of a multi-layer composition according to the present invention may constitute the continuous overlaying transparent topcoat of U.S. Pat. No. 3,551,025 which is incorporated here by reference and the non-fluoropolymer layer may constitute the binder of the same.

The following examples are offered to aid in the understanding of the present invention and are not to be construed as limiting the scope thereof. Unless otherwise indicated, all parts and percentages are by weight.

EXAMPLES

Test Procedures

Viscosity Measurement

All viscosity measurements were made using a Rheometric Dynamic Analyser™ 700 (available from Rheometric Scientific, Piscataway, N.J.) operating at 193° C., a shear rate of 100 rad/sec with a 10% strain using 25 mm diameter parallel plates. Viscosity data is reported in poise.

Peel Strength

Peel strength of laminated samples was determined following the test procedures described in ASTM D-1876 entitled "Standard Test Method for Peel Resistance of Adhesives", more commonly known as the "T-peel" test. Unless otherwise noted, T-peel samples were prepared by laminating a film of the tie-layer formulation to a 1 mm thick film of THV 200. Laminate constructions were prepared by pressing a film of the tie layer composition and a THV 200 film under an approximately 1 kgf/cm$^2$ initial pressure at the temperature and time indicated in Table 1. Tabs to grip the two film components of the laminate were provided by inserting a strip of poly(tetrafluoroethylene) (PTFE) between a portion of the tie-layer sheet and the THV 200 sheet along one edge of the laminate construction to prevent the two materials from bonding together. The laminated samples were cut into 2.54 cm (1 inch) wide strips for peel testing. Peel data was generated using a Sintech™ Tester 20 (available from MTS Systems Corporation, Eden Prairie, Minn.) operating at a cross-head speed of 10.4 cm/min. Peel data is reported in kg/2.54 cm width.

Correlation of peel strength of a tie layer/THV 200 laminate construction and polyurethane film/tie layer/THV 200 laminate constructions was provided with tie layer compositions of Examples 2, 7, and 8 where the peel strength of the tie layer/THV 200 and polyurethane film/tie layer/THV 200 constructions were within experimental error.

Correlation of peel strength of a THV 200/tie layer/THV 200 laminate with a tie layer/THV 200 laminate or a polyurethane/tie layer/THV 200 laminate was provided with the tie layer compositions of Examples 2 and 8.

Examples 1–15

"Tie-layer" compositions were prepared in a two step process wherein the nylon and diamine were prereacted in a melt blending operation followed melt blending the prereacted nylon/diamine mixture with a polyurethane resin to produce the "tie-layer" composition.

Nylon 12 (Vestamid™ L2101F Natural, available from H üls America, Inc., Piscataway, N.J.) and 1,12-diaminododecane (available from Aldrich Chemical Co. Inc., Milwaukee, Wis.) were pre-reacted by melt blending at 230° C. for 10 minutes using a Plastic Corder mixer (an internal bowl mixer equipped with roller blades, available from C.W. Brabender Instruments, Inc., South Hackensack, N.J.). A portion of the prereacted nylon/diamine blend was then added to Morthane™ L424.167 polyurethane resin (melt index 30, available from Morton International, Inc., Seabrook, N.H.) to produce the polyurethane/nylon/diamine tie-layer compositions in the wt./wt./wt. ratios indicated in Table 1 and the mixture melt blended at 193° C. for 10 minutes using a Plastic Corder mixer. Viscosity of the blends, which was determined as described above, is reported in Table 1. A film of the tie-layer composition was prepared by pressing a portion of the mixture into an approximately 1mm thick film using a hot press (193° C., approximately 30 seconds and approximately 1 kgf/cm$^2$ initial pressure). The resulting film was laminated to a THV 200 film under approximately 1 kgf/cm$^2$ initial pressure, using the temperatures and times indicated in Table 1. Peel strength data of the adhesive bond between the films was determined as described in the Peel Test procedure above and is reported in Table 1.

Example 16

A tie-layer composition of the present invention was prepared as described in Example 2 except that 4,4'-methylene dianiline (an aromatic amine available from Aldrich Chemical Co., Inc.) was substituted for 1,12-diaminododecane. Peel strength data of the adhesive bond between the films, which was determined as described in the Peel Test procedure above, is reported in Table 1.

Example 17

A tie-layer composition of the present invention was prepared as described in Example 2 except that 3,9-bis-(3 aminopropyl)-2,4,8,10-tetroxapino[5,5]undecane (F-100, a cycloaliphatic amine available from Ajinomoto USA, Inc., Teaneck, N.J.) was substituted for 1,12-diaminododecane. Peel strength data of the adhesive bond between the films, which was determined as described in the Peel Test procedure above, is reported in Table 1.

Example 18

A tie-layer composition of the present invention was prepared as described in Example 2 except that polyoxyethylenediamine (Jeffamine™ EDR-148, an oligomeric aliphatic amine available from Texaco Chemical Co., Bellaire, Tex.) was substituted for 1,12-diaminododecane. Peel strength data of the adhesive bond between the films, which was determined as described in the Peel Test procedure above, is reported in Table 1.

Example 19

A tie-layer composition of the present invention was prepared as described in Example 13 except that 1 part tetrabutylphosphonium bromide (available from Aldrich Chemical) was added to the composition.

Comparative Example C-1

A film pressed from Morthane L424.167 resin (approximately 1 mm thick) was laminated to THV 200 film at 193° C. for 1, 2, 3, and 10 minutes under about 1 kgf/cm² initial pressure and the peel strength of the adhesive bond between the films determined as described in the Peel Test procedure above. Peel strength data of the adhesive bond between the films, which was determined as described in the Peel Test procedure above, is reported in Table 1.

Comparative Example C-2

Morthane L424.167 polyurethane resin and Nylon 12 were melt blended in a 90/10 weight ratio at 193° C. for 10 minutes in a Plastic Corder mixer and subsequently pressed into an approximately 1 mm thick film as described in Example 1. The resulting film was laminated to a THV 200 film as described in Comparative Example C-1. The peel strength of the adhesive bond between the films was determined as described in the Peel Test procedure above, and the corresponding results are reported in Table 1.

Comparative Example C-3

Morthane L424.167 polyurethane resin and 1,12-diaminododecane were melt blended in a 99.5/0.5 weight ratio at 193° C. for 10 minutes in a Plastic Corder mixer and subsequently pressed into an approximately 1 mm thick film as described in Comparative Example C-1. The resulting film was laminated to a THV 200 film as described in Example 1 and the peel strength of the adhesive bond between the films determined as described in the Peel Test procedure above.

Comparative Example C-4

Morthane L424.167 polyurethane resin and 1,12-diaminododecane were melt blended in a 98.0/2.0 weight ratio at 193° C. for 10 minutes in a Plastic Corder mixer and subsequently pressed into an approximately 1 mm thick film as described in Comparative Example C-1. The resulting film was laminated to a THV 200 film as described in Example 1 and the peel strength of the adhesive bond between the films determined as described in the Peel Test procedure above.

Comparative Example C-5

Morthane L424.167 polyurethane resin, Nylon 12, and 1,12-diaminododecane were melt blended in a 90.0/9.0/1.0 weight ratio at 193° C. for 10 minutes in a Plastic Corder mixer and subsequently pressed into an approximately 1 mm thick film as described in Comparative Example C-1. The resulting film was laminated to a THV 200 film as described in Example 1 and the peel strength of the adhesive bond between the films determined as described in the Peel Test procedure above.

TABLE 1

Tie Layer Viscosity and Peel Adhesion Data

| Example | PU/Nylon/Diamine | Viscosity (poise) | Peel Strength (kg/2.54 cm width) Lamination Conditions (° C./minute) | | | | |
|---|---|---|---|---|---|---|---|
| | | | 193° C. × 1 min | 193° C. × 2 min | 193° C. × 3 min | 193° C. × 10 min | 230° C. × 2 min |
| 1 | 74.5/25/0.5 | 16,330 | — | 0.1 | — | — | — |
| 2 | 73/25/2 | 6,560 | — | 9.6[a,b] | — | — | — |
| 3 | 70/25/5 | 1,330 | — | 21.1 | — | — | — |
| 4 | 68/25/7 | 250 | — | 21.7[c] | — | — | — |
| 5 | 65/25/10 | 80 | — | 6.3[c] | — | — | — |
| 6 | 96/2/2 | 2,470 | — | 9.2 | — | — | — |
| 7 | 86/12/2 | 4,950 | — | 11.4[d] | — | — | — |
| 8 | 66/32/2 | 7,330 | — | 5.5[e,f] | — | — | — |
| 9 | 48/50/2 | 14,100 | — | 2.8 | — | — | — |
| 10 | 90/9/1 | 11,800 | 3.3 | 5.7 | 7.2 | — | — |
| 11 | 95/4.5/0.5 | 9.230 | — | 0.1 | 0.2 | 5.6 | |
| 12 | 89.1/8.9/2 | 4,690 | 3.9 | 4.8 | 11.8 | — | — |
| 13 | 88.2/8.8/3 | 1,580 | 7.2 | — | — | — | — |
| 14 | 95/4/1 | 12,000 | 1.5 | 2.9 | 4.2 | — | — |
| 15 | 80/19/1 | 16,200 | 0.8 | 3.6 | 4.4 | — | — |
| 16 | 73/25/2 | — | — | 1.7 | — | — | 5.6 |
| 17 | 73/25/2 | — | — | 11.5 | — | — | 15.9 |
| 18 | 73/25/2 | — | — | 0.5 | | | 5.9 |
| 19 | 88.2/8.8/2/1[g] | 1,490 | 3.8 | 6.7 | — | — | — |
| C-1 | 100/0/0 | 17,600 | — | — | — | — | — |
| C-2 | 90/10/0 | — | — | — | 0.2 | 0.3 | — |
| C-3 | 99.5/0/0.5 | 9,311 | 0.6 | — | — | — | — |
| C-4 | 98/0/2 | 940 | — | 9.9 | — | — | — |
| C-5 | 90/9/1 | 547 | 3.3 | 7.3 | 9.2 | — | — |

[a]T-peel for a PU//73/25/2//THV 200 laminate (193° C. × 2 min.) was 9.0 kg/2.54 cm
[b]T-peel for a THV 200//73/25/2//THV 200 laminate (193° C. × 2 min.) was 9.4 kg/2.54 cm
[c]T-peel determined using a THV 200//tie layer//THV 200 laminate because of the low cohesive strength of the tie layer composition
[d]T-peel for a PU//86/12/2//THV 200 laminate (193° C. × 2 min.) was 11.1 kg/2.54 cm
[e]T-peel for a PU//66/32/2//THV 200 laminate (193° C. × 2 min.) was 5.9 kg/2.54 cm
[f]T-peel for a THV 200//66/32/2//THV 200 laminate (193° C. × 2 min.) was 4.9 kg/2.54 cm
[g]1 part Tetrabutylphosphonium bromide (available from Aldrich Chemical) added to the composition.

Example 20

A tie layer composition (90/9/1) of the present invention was prepared as follows:

A Berstorff 40 mm diameter co-rotating twin screw extruder with a 40:1 length diameter ratio was utilized with an open feed port at zone 1 and a vacuum port at zone 8. Double start fully intermeshing screws, rotating at 19 revolutions per minute, were used throughout the entire length of the barrel with forward and reverse kneading blocks and blister ring elements added between zones 3 and 8. The temperature profile for each of the 160 mm zones was: zone 1=25° C.; zone 2=200° C.; zone 3 through zone 7=250° C.; zone 8=200° C.; zone 9=200° C.; zone 10=175° C.; endcap=175° C.; and melt pump=175° C. All reactant feed streams were maintained under a nitrogen atmosphere. 1,12-Diaminododecane was fed into zone 1 of the extruder at a rate of 0.45 kg/hr. Nylon 12 pellets (Vestamid™ L2101F, available from Hüls America, Inc.), which had been dried approximately 12 hours with dry air in a Novatec™ commercial dryer operated at about 71° C., were fed into zone 1 at a rate of 4.1 kg/hr. The vacuum port at zone 8 was attached to an isopropanol/dry ice cooled vacuum trap and was operated at 648 mm Hg. The melt pump, operated at 11.5 revolutions per minute, was utilized to afford a uniform flow of the reacted nylon/diamine composition to form a 2.5 mm diameter strand which was extruded into a Fluorinert™ (a perfluorochemical inert liquid, available from 3M, St. Paul, Minn.)/dry ice bath and pelletized. This nylon/diamine composition was utilized as the disperse phase in a polyurethane matrix to afford a reactive tie layer composition by a dry blending method or through an extrusion compounding process with the component pellets. Extrusion compounding utilized an extrusion design having a temperature profile as follows: zone 1=25° C.; zone 2 through zone 10=200° C.; endcap=200° C.; and melt pump=200° C. Prereacted nylon/diamine pellets were fed into zone 1 at a rate of 0.91 kg/hr. Polyurethane pellets, (Morthane™ L424.167) which had been dried approximately 12 hours with dry air in a Novatec™ commercial dryer operated at about 49° C., were fed into zone 1 at a rate of 8.18 kg/hr. The extruder screw was rotated at 30 revolutions per minute and the melt pump at 23 revolutions per minute with the vacuum as described above at zone 8 operated at 648 mm Hg. The extrusion compounded polyurethane/nylon/diamine composition was pelletized as detailed above.

A film of the tie layer composition was prepared by hot pressing polymer pellets of the composition between PET sheets at 70.31 kgf/cm² and 177° C. for 1 min. Composite laminates were prepared by pressing films of THV 200 (~10 mil thick), tie layer (~10 mil thick), and polyurethane (Morthane™ L424.167, ~20 mil thick), with 1.0–2.54 cm release tabs positioned between both the tie layer and the THV 200 or polyurethane, sandwiched between PET sheets, and the laminate construction heated at 177° C. for 3 minutes by positioning the laminate between the heated platens of a hot press so that the laminate just contacted both the upper and lower platen under essentially zero applied pressure. The laminates were die cut into 2.54 cm×17.78 cm test samples for peel strength analysis as measured by Instron™ analysis as follows: The release tabs were removed and the THV 200 (upper jaw) and polyurethane (lower jaw) were clamped with a 2.54 cm overall jaw gap and peel values measured at a rate of 10.4 cm/min. The Polyurethane/nylon/diamine tie layer prepared as described above afforded peel adhesion values ranging from 1.4 to 2.9 kg/cm.

Example 21

A tie layer composition (80/16/4) of the present invention was prepared substantially as described in Example 20 with the following modifications. Double start fully intermeshing screws, rotating at 30 revolutions per minute, were used throughout the entire length of the barrel with forward and reverse kneading blocks and blister ring elements added between zones 3 and 8 and forward kneading blocks used in zones 9 and 10. The temperature profile for each of the 160 mm zones was: zone 1=25° C.; zone 2=200° C.; zone 3 through zone 4=250° C.; zone 5 through zone 6=255° C.; zone 7=250° C.; zone 8 through zone 10=200° C.; endcap= 200° C.; and melt pump=200° C. 1,12=diaminododecane was fed at a rate of 6.82 g/min into zone 1. Nylon 12 pellets were fed into zone 1 at a rate of 27.27 g/min. The vacuum port at zone 8 was operated at 648 mm Hg. A Brabender single screw extruder, fitted with a general conveying screw of 3:1 compression ratio, with temperature profile of water cooled feedthroat; zone 1 through zone 2=210° C.; zone 3 through endcap=220° C.; neck tube=230° C. was hard= piped into zone 9. The Brabender extruder was operated at 42 revolutions per minute to afford a melt stream flow rate of polyurethane (Morthane™ L432.27) into the 40 mm twin screw extruder of 136 g/min. The Berstorff 40 mm twin screw extruder melt pump, operated at 17 revolutions per minute, was utilized to afford a uniform flow of the reacted polyurethane/nylon/diamine composition to form a 2.5 mm diameter strand which was extruded into a Fluorinert™/dry ice bath and pelletized. This prereacted polyurethane/nylon/ diamine composition was evaluated in laminate constructions as described in Example 20 to afford peel adhesion values ranging from 2.7 to 3.4. kg/cm.

Example 22

A tie layer composition (90/9/1) was prepared as described in Example 20 and later re-extruded to produce a three-layer co-extruded polyurethane:tie layer:THV 200 construction. A Cloeren™ 3-layer co-extrusion feedblock (available from Cloeren Co., Orange Tex.) fitted with an C-A-B selector plug was used to prepare the co-extruded construction described. Three Killion™ 32 mm single screw extruders, each fitted with a Maddock mixing screw of 3:1 compression ratio and a 40-80-80-40 screen pack, were used to provide the polymer melt streams for the co-extruded construction. The polyurethane (Morthane™ L424.167), which had been dried approximately 12 hours in a Despatch commercial drier operated at approximately 49° C., was extruded as the outer layer from extruder C which was fitted with a screw having an L/D of 34:1 and operated at a screw rate of 21.1 revolutions per minute. The temperature profile used was: zone 1=154° C.; zone 2=166° C.; zone 3=177° C.; zone 4=188° C.; zone 5=193° C.; and neck tube=193° C. with a melt temperature of 189° C. The polyurethane/nylon/ diamine tie layer material was extruded from extruder A which was fitted with a screw having an L/D of 24:1 and operated at a screw rate of 13.3 revolutions per minute. The temperature profile used was: zone 1=154° C.; zone 2=177° C.; zone 3=193° C.; and neck tube=193° C.; with a melt temperature of 202° C. The THV 200 was extruded as the base layer onto the PET liner covered chrome cast role from extruder B, which had an LID ratio of 24:1. The screw for extruder B was operated at 21.7 revolutions per minute and the temperature profile used was: zone 1=193° C.; zone 2=216° C.; zone 3=227° C.; and neck tube=227° C.; with a melt temperature of 220° C. The three polymer streams were each fed into separate ports of the Cloeren™ feedblock which was heated at 193° C. The feedblock was plumbed into an 46 cm EDI™ die (available from Extrusion Dies, Inc. of Chippewa Falls, Wis.), heated to 199° C., which was used to cast the molten 3-layer film onto the PET liner covered chrome chill roll, operated at 4.1 m/min., to afford a ca 3 mil co-extruded construction of 36 cm wide finished slit width. The resultant 3-layer co-extruded film demonstrated good interlayer adhesion under repeated flexing of the film.

Example 23

In Example 23, a blend containing 1.0 kg EMS Grilamid™ 4943, believed to be an amine modified nylon 12, and 0.9 Kg Dupont Bynel™ 4003, an anhydride functionalized high density polyethylene (AM-HDPE), was prepared by first mixing a 2-gallon container having the above pelletized materials in a tumbler for approximately 30 minutes. The mixed materials were then melt-blended by coextrusion in a Rheomix™ TW 100 conical twin-screw extruder with high intensity screws, available from Haake Buchler Instruments Inc. The pre-mixed blend was fed to the twin-screw extruder by an Accurate™ solids feeder and extruded as a strand at 220° C. and 200 rpm giving a throughput of appoximately 2 Kg/hr. The extrudate was quenched in a water bath and pelletized. The resulting extruder-mixed high density polyethylene/amine-modified nylon blend was then cast into film using a Rheomex™ 254 single screw extruder also available from Haake Buchler Instruments, Inc. The blend was extruded as a film at 200° C. and 50 rpm. The resulting 13 cm (5.25 in) wide film was cast onto a 240° C. steel roll to a final thickness of 0.025 cm (0.01 in).

A composite was made with 1.25 cm by 5.08 cm (0.5 in by 2 in) samples of the extruder-mixed adhesive film and two 2.54 cm by 7.62 cm (1 in by 3 in) layers of 0.064 cm (0.025 in) thick sheets of a terpolymer of tetrafluorethylene (TFE), hexafluoropropylene (HFP) and vinylidene fluoride (VDF), made from resin available from Dyneon LLC as THV 500. A 2.54 cm by 7.62 cm (1 in by 3 in) 0.32 cm (125 mil) thick sheet of Petromont™ DMDA 6147 high density polyethylene was placed on the other side of the extruder-mixed adhesive film giving a final structure of a layer of high density polyethylene, the middle layer of an extruder mixed Grilamid 4943-Bynel 4003 blend and a third layer of the two 0.064 cm (25 mil) sheets of THV 500.

To facilitate testing via the described peel strength test, a sheet of 0.00762 cm (3 mil) perfluorinated ethylene-propylene (FEP) film was placed between the THV and high density polyethylene layers. The FEP film was inserted about 1.25 cm (0.5 in) only along the shorter edge of the 2.54 cm by 7.62 cm (1 in by 3 in) sample. The FEP film did not adhere to either of the layers and was used only to create a THV "tab" and a polyethylene "tab" to insert into the jaws of the test device.

Three identical composites were simultaneously heated under pressure using a Wabash Hydraulic Press Co. heated platen press at 230° C. and 686 kPa (100 p.s.i.) for 3 minutes. The samples were removed for the press and allowed to cool to room temperature. Peel strength was measured on the samples. An Instron™ Model 1125 tester, available from Instron Corp., set at a 100 mm/min crosshead speed was used as the test device. The peel strength was calculated as the average load measured during the peel test. The measured peel strength from Example 23 is reported in Table 2.

Example 24

In Example 24, 40 g of the pelletized blend of 1.0 Kg EMS Grilamid™ 4943 and Dupont Bynel™ 4003 described in Example 23 was further modified by the addition of 0.4 g Dyneon FX 5166, a tributyl allyl phosphonium chloride catalyst compound, and 0.4 g calcium hydroxide powder (available from C.P. Hall Co.) using a Rheomix™ 600 internal bowl mixer equipped with roller blades, available from Haake Buchler Intstruments Inc., set at a temperature of 220° C. and a mixer rotor setting of 50 rpm. The pelletized adhesive blend was first melted in the mixing bowl for approximately one minute followed by the FX-5166 and calcium hydroxide, and the entire composition was mixed for an additional ten minutes. The internal-bowl mixed adhesive compound was then removed from the mixer and molded at 230° C. into a sheet approximately 10 mils (0.00254 cm) using a 10 mil shim stock and a Wabash Hydraulic Press Co. heated platen press. After cooling, a composite was prepared and tested as in Example 23 except the middle adhesive layer consisted of a 1.25 cm by 5.04 cm (0.5 in by 2 in) sheet of the above described internal-bowl mixed adhesive blend containing the phoshphonium-calcium hydroxide catalysts. The test results for Example 24 are summarized in Table 2.

Comparative Example C-6

In Comparative Example C-6, 20 g of DMDA 6147 high density polyethylene (HDPE), available from Petromont, and 20 g Vestamide™ polyamide 12 (PA12), available from Huls, were blended using a Rheomix 600 internal bowl mixer equipped with roller blades set at a temperature of 220° C. and a mixer rotor setting of 50 rpm. The pellets of the two components were added to the mixing bowl and blended for three minutes. The internal-bowl mixed compound was then removed from the mixer and molded at 230° C. into a sheet approximately 10 mils (0.0254 cm) using a 10 mil shim stock and a Wabash Hydraulic Press Co. heated platen press. After cooling, a composite was prepared and tested as in Example 23 except the middle adhesive layer consisted of a 1.25 cm by 5.04 cm (0.5 in by 2 in) sheet of the above described internal-bowl mixed PA12-HDPE blend. No measurable bonding was observed for this sample.

Comparative Example C-7

In Comparative Example C-7, a 10 mil (0.025 cm) thick sheet of EMS Grilamid™ 4943 amine modified nylon was molded at 230° C. into a sheet approximately 0.0254 cm (10 mil) using a 10 mil shim stock and a Wabash Hydraulic Press Co. heated platen press. The composite sample was prepared and tested as in Example 23 except the middle adhesive layer consisted of a 1.25 cm by 5.08 cm (0.5 in by 2 in) sheet of 0.0254 cm (10 mil) thick Grilamid 4943 amine modified nylon. No measurable bonding was observed for this sample.

Comparative Example C-8

In Comparative Example C-8, 40 g of Bynel™ 4003, anhydride modified high density polyethylene (AM HDPE) available from Dupont was blended with 0.2 g dodecyl diamine (DDDA), available from Aldrich Chemical Co., using a Rheomix 600 internal bowl mixer equipped with roller blades set at a temperature of 180° C. and a mixer rotor setting of 30 rpm. The two components were added to the mixing bowl and blended for fifteen minutes. The internal-bowl mixed compound was then removed from the mixer and molded at 230° C. into a sheet approximately 0.0254 cm (10 mil) using a 10 mil shim stock and a Wabash Hydraulic Press Co. heated platen press. After cooling, a composite was prepared and tested as in Example 23 except the middle adhesive layer consisted of a 1.25 cm by 5.04 cm (0.5 in by 2 in) sheet of the above described internal-bowl mixed amine modifed MA HDPE compound. The test results for Comparative Example C-8 are reported in Table 2.

Example 25

In Example 25, 20 g of the Grilamid 4943 amine modified nylon, and 20 g of Admer™ nf500A polyolefin based resin, available from Mitsui Petrochemicals America Co., were blended using a Rheomix 600 internal bowl mixer equipped with roller blades set at a temperature of 220° C. and a mixer rotor setting of 50 rpm. The pellets of the two components were added to the mixing bowl and blended for three minutes. The internal-bowl mixed compound was then removed from the mixer and molded at 230° C. into a sheet approximately 0.0254 cm (10 mil) using a 10 mil shim stock and a Wabash Hydraulic Press Co. heated platen press. After cooling, a composite was prepared and tested as in Example 23 except the middle adhesive layer consisted of a 1.25 cm by 5.04 cm (0.5 in by 2 in) sheet of the above described internal-bowl mixed amine modified nylon/polyolefin blend. The test results for Example 25 are reported in Table 2.

Example 26

In Example 26, 20 g of the Grilamid 4943 amine modified nylon, and 20 g of Admerm™ sf600 polyolefin based resin, available from Mitsui Petrochemicals America Co., were blended using a Rheomix 600 internal bowl mixer equipped with roller blades set at a temperature of 220° C. and a mixer rotor setting of 50 rpm. The pellets of the two components were added to the mixing bowl and blended for three minutes. The internal-bowl mixed compound was then removed from the mixer and molded at 230° C. into a sheet approximately 0.0254 cm (10 mil) using a 10 mil shim stock and a Wabash Hydraulic Press Co. heated platen press. After cooling, a composite was prepared and tested as in Example 23 except the middle adhesive layer consisted of a 1.25 cm by 5.04 cm (0.5 in by 2 in) sheet of the above described internal-bowl mixed amine modified nylon/polyolefin blend. The test results for Example 26 are reported in Table 2.

Example 27

In Example 27, 20 g of the Grilamid 4943 amine modified nylon, and 20 g of DMDA 6147 high density polyethylene (HDPE), available from Petromont, were blended using a Rheomix 600 internal bowl mixer equipped with roller blades set at a temperature of 220° C. and a mixer rotor setting of 50 rpm. The pellets of the two components were added to the mixing bowl and blended for three minutes. The internal-bowl mixed compound was then removed from the mixer and molded at 230° C. into a sheet approximately 0.0254 cm (10 mil) using a 10 mil shim stock and a Wabash Hydraulic Press Co. heated platen press. After cooling, a composite was prepared and tested as in Example 23 except the middle adhesive layer consisted of a 1.25 cm by 5.04 cm (0.5 in by 2 in) sheet of the above described internal-bowl mixed amine modified nylon—HDPE blend. The test results for Example 27 are reported in Table 2.

Example 28

In Example 28, a composite sample was prepared and tested as in Example 23 except that the extruder mixed adhesive film was prepared from 0.33 kg Grilamid 4943 and 1.0 kg Bynel 4003. Test results for Example 28 are reported in Table 2.

Example 29

In Example 29, a composite sample was prepared and tested as in Example 23 except that the extruder mixed adhesive film was prepared from 1.0 kg Grilamid 4943 and 0.3 kg Bynel 4003. Test results for Example 29 are reported in Table 2.

TABLE 2

| Example # | Composite Construction | Peel (Kg./2.54 cm) | Failure Interface |
|---|---|---|---|
| 23 | 1: THV 500<br>2: 53% Grilamid ™ + 47% MA HDPE<br>3: HDPE | 5.2 | HDPE |
| 24 | 1: THV 500<br>2: 52% Grilamid + 46% Bynel + 1% FX5166 + 1% calcium hydroxide<br>3: HDPE | 9.1 | HDPE |
| C-6 | 1: THV 500<br>2: 50% PA12 + 50% HDPE<br>3: HDPE | 0 | — |
| C-7 | 1: THV 500<br>2: Grilamid 4943<br>3: HDPE | 0 | HDPE |
| C-8 | 1: THV 500<br>2: MA HDPE + 0.5% DDDA<br>3: HDPE | 2.9 | THV |
| 25 | 1: THV 500<br>2: 50% Grilamid 4943 + 50% Admer nf500A<br>3: HDPE | 5.1 | THV |
| 26 | 1: THV 500<br>2: 50% Grilamid 4943 + 50% Admer sf600<br>3: HDPE | 3.9 | THV |
| 27 | 1: THV 500<br>2: 50% Grilamid 4943 + 50% HDPE<br>3: HDPE | 3.4 | THV |
| 28 | 1: THV 500<br>2: 25% Grilamid 4943 + 75% MA HDPE<br>3: HDPE | 4.3 | THV |
| 29 | 1: THV 500<br>2: 75% Grilamid 4943 + 25% MA HDPE<br>3: HDPE | 0.5 | HDPE |

Various modifications and alterations of this invention will be apparent to those skilled in the art without departing from the scope and spirit of this invention, and it should be understood that this invention is not limited to the illustrative embodiments set forth herein.

We claim:

1. A method of bonding fluoropolymer to substantially non-fluorinated polymeric material, the method comprising the steps of:

(a) providing a bonding composition comprising primary or secondary di- or polyamine and a melt processable first substantially non-fluorinated base polymer wherein said first substantially non-fluorinated polymer is combinatively reactive with said di- or polyamine;

(b) reacting the bonding composition to form an amine-functional base polymer;

(c) combining the amine-functional base polymer with a second substantially non-fluorinated polymer that is not the same polymer as the first substantially non-fluorinated base polymer comprising said bonding composition to form a substantially non-fluorinated polymeric blend material, wherein said second substantially non-fluorinated polymer comprises a polymer selected from the group consisting of: polyurethanes, modified and unmodified polyolefins, polyesters, polycarbonates, polyketones, polyureas, polyacrylates, and polymethacrylates;

(d) providing a fluoropolymer; and (e) forming a multi-layer article comprising a substantially non-fluorinated layer made of the substantially non-fluorinated polymeric blend material in contact with a fluorinated layer made of the fluoropolymer, wherein the amine-functional base polymer is present at the interface of the substantially non-fluorinated layer in an amount sufficient to bond the two layers.

2. The method of claim 1 wherein said non-fluorinated layer and said fluorinated layer are coextruded.

3. The method of claim 1 further comprising the step of applying at least one additional layer to at least one side of the resulting multi-layer composition.

4. The method of claim 3 wherein said non-fluorinated layer, said fluorinated layer, and said additional layer are co-extruded.

5. The method of claim 1 wherein said fluoropolymer comprises interpolymerized units derived from vinylidene fluoride.

6. The method of claim 1 wherein said fluoropolymer is a homopolymer of vinylidene fluoride or is a copolymer or terpolymer derived vinylidene fluoride and one or more monomers selected from the group consisting of tetrafluoroethylene, and hexafluoropropylene.

7. The method of claim 1 wherein said fluoropolymer is fluoroplastic.

8. The method of claim 1 wherein said fluoropolymer is a fluoroelastomer.

9. The method of claim 1 wherein said fluoropolymer comprises interpolymerized units derived from monomers comprising one or more hexafluoropropylene, tetrafluoroethylene, and chlorotrifluoroethylene monomer and one or more non-fluorinated olefinically-unsaturated monomer.

10. The method of claim 1 wherein said fluoropolymer comprises interpolymerized monomeric units derived from monomers comprising tetrafluoroethylene, ethylene, and hexafluoropropylene.

11. The method of claim 1 wherein said fluoropolymer comprises interpolymerized monomeric units derived from monomers comprising tetrafluoroethylene and propylene.

12. The method of claim 1 wherein said bonding composition further comprises tackifier.

13. The method of claim 1 wherein said bonding composition further comprises catalyst.

14. The method of claim 13 wherein said catalyst is an organo-onium compound.

15. The method of claim 1 wherein said bonding composition further comprises a tertiary amine or an amidine.

16. A shaped article made according to the method of claim 1.

17. A method of bonding fluoropolymer to substantially non-fluorinated polymeric material, the method comprising the steps of:
  (a) providing a bonding composition comprising primary or secondary di- or polyamine and a melt processable first substantially non-fluorinated base polymer wherein said first substantially non-fluorinated polymer is combinatively reactive with said di- or polyamine;
  (b) combining the bonding composition with a second substantially non-fluorinated polymer that is not the same polymer as the first substantially non-fluorinated base polymer comprising said bonding composition wherein said second substantially non-fluorinated polymer is not chemically degraded by said di- or polyamine, to form a substantially non-fluorinated polymeric blend material, wherein said second substantially non-fluorinated polymer comprises a polymer selected from the group consisting of: polyurethanes, modified and unmodified polyolefins, polyesters, polycarbonates, polyketones, polyureas, polyacrylates, and polymethacrylates;
  (c) providing a fluoropolymer; and
  (d) forming a multi-layer article comprising a substantially non-fluorinated layer made of the substantially non-fluorinated polymeric blend material in contact with a fluorinated layer made of the fluoropolymer, wherein the bonding composition is present at the interface of the substantially non-fluorinated layer and the fluorinated layer in an amount sufficient to bond the two layers.

18. A multi-layer article comprising:
  (a) a first layer comprising fluoropolymer; and
  (b) a second layer comprising:
    (1) an amine-functional, substantially non-fluorinated base polymer made by reacting a primary or secondary aliphatic di- or polyamine with a melt-processable first substantially non-fluorinated polymer; and
    (2) a second substantially non-fluorinated polymer that is not the same polymer as said first substantially non-fluorinated polymer, wherein said second substantially non-fluorinated polymer comprises a polymer selected from the group consisting of: polyurethanes, modified and unmodified polyolefins, polyesters, polycarbonates, polyketones, polyureas, polyacrylates, and polymethacrylates;
wherein the amine-functional base polymer is present in said second layer in an amount sufficient to bond the first and second layers.

19. The article of claim 18 further comprising at least one additional layer on at least one side of said article.

20. The article of claim 18 wherein said fluoropolymer comprises interpolymerized units derived from vinylidene fluoride.

21. The article of claim 18 wherein said fluoropolymer is a homopolymer of vinylidene fluoride or is a copolymer or terpolymer derived from vinylidene fluoride and one or more monomers selected from the group consisting of tetrafluoroethylene, and hexafluoropropylene.

22. The article of claim 18 wherein said fluoropolymer is fluoroplastic.

23. The article of claim 18 wherein said fluoropolymer is a fluoroelastomer.

24. The article of claim 18 wherein said fluoropolymer comprises interpolymerized units derived from monomers comprising one or more hexafluoropropylene, tetrafluoroethylene, and chlorotrifluoroethylene monomer and one or more non-fluorinated olefinically-unsaturated monomer.

25. The article of claim 18 wherein said fluoropolymer comprises interpolymerized monomeric units derived from monomers comprising tetrafluoroethylene, ethylene, and hexafluoropropylene.

26. The article of claim 18 wherein said fluoropolymer comprises interpolymerized monomeric units derived from monomers comprising tetrafluoroethylene and propylene.

27. The article of claim 18 wherein said second layer further comprises tackifier.

28. The article of claim 18 wherein said second layer further comprises catalyst.

29. The article of claim 28 wherein said catalyst is an organo-onium compound.

30. The article of claim 18 wherein said second layer further comprises a tertiary amine or an amidine.

31. The article of claim 18 further comprising transparent microspheres.

32. The article of claim 18 wherein said article is a hose, container, sheet or film.

33. The article of claim 18 wherein said fluoropolymer is a fluoroplastic, said substantially non-fluorinated polymer is thermoplastic, and said amine is a primary alkylene diamine.

34. The article of claim 18 further comprising a retroreflective base sheet.

35. The article of claim 34 wherein said retroreflective base sheet comprises a monolayer of transparent microspheres and reflective means disposed on the side of said microspheres opposite said second layer.

36. The article of claim 18 wherein retroreflective elements are formed on said second layer.

37. The article of claim 36 wherein said retroreflective elements are cube-corner reflective elements.

* * * * *